United States Patent [19]

Whaley

[11] Patent Number: 4,958,519

[45] Date of Patent: Sep. 25, 1990

[54] VELOCIMETER

[75] Inventor: Paul W. Whaley, Lincoln, Nebr.

[73] Assignee: The Board of Regents of the University of Nebraska, Lincoln, Nebr.

[21] Appl. No.: 845,490

[22] Filed: Mar. 31, 1986

Related U.S. Application Data

[63] Continuation-in-part of Ser. No. 342,098, Jan. 25, 1982, abandoned.

[51] Int. Cl.$^5$ ............................................. G01C 19/56
[52] U.S. Cl. ........................................................ 73/505
[58] Field of Search ......................... 73/505, 510, 650; 310/321, 323

[56] References Cited

U.S. PATENT DOCUMENTS

| | | | |
|---|---|---|---|
| 2,494,109 | 1/1950 | Wolfe | 73/517 R |
| 2,544,646 | 3/1951 | Barnaby et al. | 73/505 |
| 2,552,722 | 5/1951 | King | 73/517 R |
| 3,127,775 | 4/1964 | Hansen et al. | 73/505 |
| 3,442,140 | 5/1969 | Pelteson | 73/504 |
| 3,525,884 | 8/1970 | Onoe et al. | 310/321 |
| 3,597,642 | 8/1971 | Kurino | 310/321 |
| 3,616,699 | 11/1971 | Brand | 73/504 |

OTHER PUBLICATIONS

"Piezoelectric Vibrating Beam Rate Gyro", by Watson from "Navy Technical Disclosure Bulletin," vol. 4, No. 6, Jun. 1979, pp. 41-45.

Primary Examiner—John Chapman
Attorney, Agent, or Firm—Vincent L. Carney

[57] ABSTRACT

To measure low-level angular vibrations such as $10^{-6}$ radians at frequencies from zero to 10 kHz in a small device two embodiments of vibrators are used: one having two parallel spaced-apart steel plates connected at their bottom end to a platform through a magnetic path and aligned with the direction of an axis of rotation of the plate and the other having a tuning fork. Between the steel plates at their upper end in the first embodiment is mounted a source of magnetic flux which, when energized, pulls the two upper ends of the plates together and releases them at a resonant vibrating frequency which is at least ten times the frequency of the highest angular velocity of the platform about the axis. In the second embodiment, a piezoelectric driver is mounted to the tuning fork at a location creating vibration at the required frequency in the tines of the tuning fork. The dimension of the plates or tunes in the direction of measurement is sufficient to prevent bending from the forces of reaction from Coriolis acceleration. Accelerometers are mounted to the vibrating plates or tunes to measure Coriolis acceleration in a direction transverse to the direction of vibration and to the axis of rotation and the demodulated signal from the accelerometers indicates the low-level angular vibration.

16 Claims, 2 Drawing Sheets 4,958,519

VELOCIMETER

This application is a continuation-in-part of application Ser. No. 342,098, filed Jan. 25, 1982, abandoned.

BACKGROUND OF THE INVENTION

This invention relates to a method and apparatus for measuring vibrations.

In one class of apparatus for measuring rotation motion of an object about an axis, a member that is movably mounted to the object is vibrated at an angle to the axis of rotation of the object. The combined effect of rotation of the object and vibration of the member is measured.

In a prior art measuring instrument of this type, the vibrating members are tines of a tuning fork velocimeter, mounted parallel to the axis of rotation about which the measurements are to be made. The tines vibrate periodically together toward and away from that axis.

In this prior art device, the tines of the fork are able to move angularly with respect to the base. As the tines move toward and away from the axis of rotation and change the distribution of mass about the axis of rotation, forces are created on the tines at an angle to the direction of vibration. These forces slow the angular motion of the tines of the fork about the axis of rotation or speed them with respect to the base to conserve angular momentum in response to the forces.

The motion between the tines and the base caused by the vibrations of the tines and the influence of conservation of momentum upon the tines during this rotation is measured. Since the speeding up and slowing down of the tines with respect to the base is related to the velocity of rotation about the axis of rotation as well as to the periodic vibration, a signal is obtained indicating the velocity.

This prior art type of measuring instrument for angular velocities has a disadvantage in that it is not able to measure changes over a wide enough bandwidth nor to measure changes with sufficient precision for many uses.

In another class of instrument for measuring angular motion, a beam is vibrated at its resonant frequency at an angle to its axis of rotation. When it rotates about its axis, the Coriolis forces created by the combined vibration and rotation are measured by a piezoelectric device. This force is indicative of the angular motion about its axis.

In the prior art devices of this class, the vibrating member is a beam mounted at both ends of its nodal point and driven at its fundamental frequency. It is aligned with the axis of rotation. The output is generated by piezoelectric crystals which are compressed by the Coriolis force to provide a DC output against certain electrodes.

This prior art velocimeter has the disadvantages of lacking sensitivity to relatively low angular changes. Some of the sensitivity is lost by excessive damping forces which reduce Coriolis and angular acceleration and instead reflect force back into the plane of vibration. Moreover, the beams are caused to accelerate in the direction of the Coriolis force, thus causing a force opposite to the Coriolis force, thus reducing the Coriolis acceleration. This reduced acceleration reduces the amount of sensed signal by treating Coriolis acceleration or Coriolis force as purely a kinetic event rather than a purely kinematic event.

SUMMARY OF THE INVENTION

Accordingly, it is an object of the invention to provide a novel method for measuring velocity.

It is a further object of the invention to provide a novel apparatus for measuring velocity.

It is a still further object of the invention to provide a novel method for measuring acceleration.

It is a still further object of the invention to provide a novel apparatus for measuring acceleration.

It is a still further object of the invention to provide a novel method and apparatus for measuring angular velocity or acceleration.

It is an object of the invention to provide a novel method and apparatus for measuring angular velocity and acceleration utilizing the Coriolis effect.

In accordance with the above and further objects of the invention, an accelerometer is mounted to a roving member of a velocimeter in a direction to measure Coriolis acceleration in a direction perpendicular to the direction of motion of the member. The velocimeter is mounted to measure movement of an object. The member's motion is preferably periodic at a frequency different than the expected movement of the object to provide a signal separable from spurious motion.

Advantageously, the angular motion measured by the accelerometer is rotation about an axis of the object and the modulation is achieved by vibrating the accelerometer periodically in a direction radial to the direction of rotation about the axis to and from the axis to achieve periodic modulation by forces created at least in part from Coriolis acceleration or tangential acceleration. The direction of motion of the member must have a component at an angle to the direction of rotation of the object being measured. In one embodiment, two parallel ferromagnetic members are moved in opposition to each other by an electromagnet positioned between them and energized at the required frequency. Accelerometers are mounted to at least one of the members to measure the force created by Coriolis acceleration. In another embodiment, the tines of a tuning fork are vibrated by a piezoelectric driver positioned between two tines at a location which matches impedance for efficiency in imparting energy to the tines and at a location which causes the upper part of the tines to vibrate at a resonant frequency of the system equal to the driving frequency of the piezoelectric crystal.

From the above description, it can be seen that the invention has the advantages of providing an unusually sensitive velocimeter, which is relatively simple, inexpensive and of small size.

SUMMARY OF THE DRAWINGS

The above noted and other features of the invention will be better understood from the following detailed description when considered with reference to the accompanying drawings in which.

SPECIFIC DESCRIPTION

Figure 1:
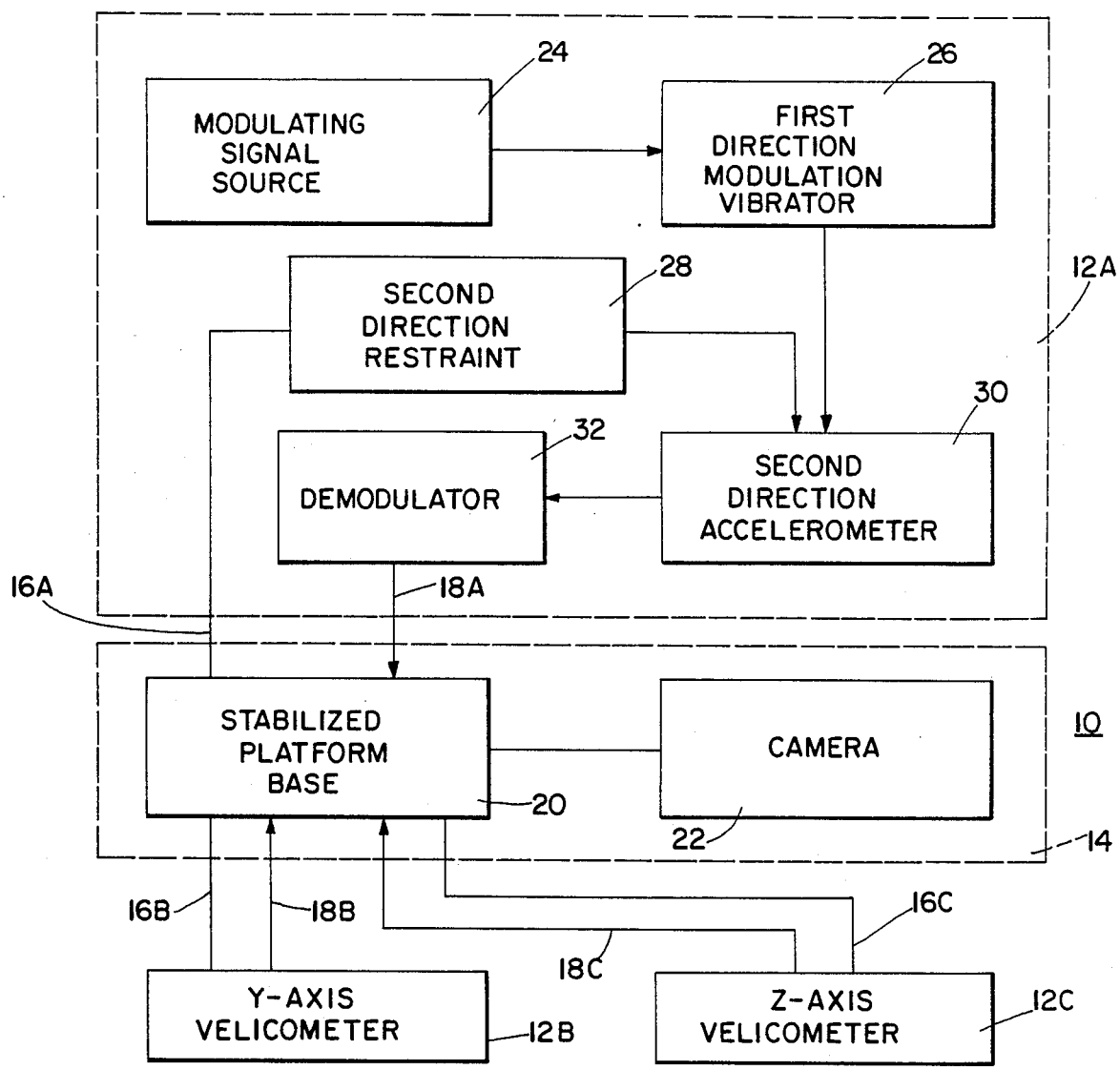
FIG. 1 is a block diagram of an embodiment of the invention.

In FIG. 1, there is shown a block diagram of a platform stabilization system 10, having X, Y and Z velocimeters 12A, 12B and 12C respectively, and a stabilized platform assembly 14.

Each of the three velocimeters 12A-12C is mounted to the stabilized platform assembly 14 as indicated by the lines 16A-16C respectively to detect angular motion about a different axis of the arbitrary X, Y and Z-axes of the stabilized platform assembly 14. One of the velocimeters 12A is shown in a more detailed block diagram form. Each of the three velocimeters 12A-12C is also electrically connected to the stabilized platform assembly 14 to provide feedback signals to it through the conductors 18A-18C respectively to reduce or prevent angular motion of the stabilized platform assembly 14.

The electrical signals may be applied from conductors 18A-18C to any conventional mounting apparatus for adjusting the position of the stablilized platform assembly 14 to compensate for such motion. For example, if the platform is mounted on an aircraft, mechanisms for adjusting its position with the aircraft may be used, or if the stabilized platform is an aircraft or missile in itself, thrust devices or fluid guiding devices may be used to provide stability to the entire apparatus. This system may be also used in a wide variety of other applications, such as to measure vibration or the like rather than to stabilize equipment, although its principal usefulness because of its sensitivity is in the stabilization of equipment.

The stabilized platform assembly 14 is shown as having a stabilized platform base 20 and a camera 22 in FIG. 1 by way of example. The stabilized platform base 20 is intended to be mounted to a vehicle by hydraulic cylinders responsive to signals on conductors 18A-18C to maintain it in a stable orientation so as to permit good quality pictures even though the vehicle may be subject to angular vibrations.

To stabilize the platform assembly 14, the velocimeter 12A includes a modulating signal source 24, a first direction modulation vibrator 26, a second direction restraint 28, a second direction accelerometer 30 and a demodulator 32.

The modulating signal source 24 causes the first direction modulation vibrator 26 to vibrate in a fixed direction generally radial to the X-axis about which the velocimeter 12A measures motion. This first direction modulation vibrator 26 carries the second direction accelerometer 30 which measures angular motion about the X-axis, which direction is transverse to the direction of vibrations caused by the first direction modulation vibrator 26. The second direction restraint 28 is mounted to the stabilized platform base 20 and prevents the second direction accelerometer 30 as it vibrates with the first direction modulation vibrator 26 from vibrating in the second direction with respect to the stabilized platform base 20.

The second direction accelerometer 30 vibrates with the first direction modulation vibrator 26 in a direction radial with respect to the X-axis and that is its only motion with respect to the stabilized platform base 20 since it is restrained otherwise. It does, of course, move with rotation about the X-axis but this rotation is rotation with the stabilized platform base 20

The signals generated by the second direction accelerometer 30 are demodulated by the demodulator 32 and applied to the stabilized platform base 20 to prevent it from rotation about the X-axis. In other embodiments, the signal on conductor 18A, instead of controlling vibration, would be used to measure the vibration such as would be the case if vibration itself were of interest.

The signal from the second direction accelerometer 30 is modulated with the modulating signal source 24 as a result of tangential acceleration, related to Coriolis acceleration. The Coriolis acceleration output is the product of the velocity caused by the first direction modulation vibrator 26 and the rotation about the X-axis that is to be measured. The demodulator 32 removes the modulating signal leaving a clearly defined amplified signal representing rotation about the X-axis.

The second direction restraint 28 prevents the Coriolis acceleration from being reduced by deflection in the direction of the acceleration. Without a restraint for motion in that direction, the force associated with the acceleration causes a force of reaction, which may be considered an inertial force, in the opposite direction, accompanied by an acceleration in that direction which reduces the measured acceleration by subtraction.

For example, in velocimeters having a vibrator that is a beam held at two end points and vibrated in one radial direction with the accelerometer in the center, the Coriolis acceleration creates a force that causes the beam to follow an elliptical path, thus reducing the measured acceleration from the Coriolis effect. In the embodiment of FIG. 1 on the other hand, the second direction restraint 28 causes the accelerometer to measure the Coriolis acceleration directly or, in the case of a piezoelectric accelerometer, to measure the force applied to it by inertia in a direction opposite to the Coriolis acceleration.

The restraint 28 should be sufficiently stiff to prevent motion of the accelerometer with respect to the platform in the second direction of more than two percent of its vibrational movement in the first direction in response to the Coriolis forces. These forces are substantially at the frequency of vibration caused by the first direction modulation vibrator. If the first direction of movement is in a predetermined path, then the sensing means or accelerometer 28 is prevented from moving in a second direction at an angle to the predetermined path by a distance that is more than two percent of the length of the movement of the sensing means along the predetermined path during one cycle of the movement of the sensing means along the predetermined paths.

In the preferred embodiment, the average frequency and velocity of the first direction modulation vibrator 26 is at least ten times the maximum frequency and velocity about the X-axis which is to be measured. The high frequency enables the demodulator 32 to detect and separate the desired signal from other signals. The multiple of velocity ensures that the rotational velocity which is to be measured is multiplied by a high number before it is detected so as to provide adequate sensitivity of the instrument. Thus, the use of a high frequency provides one benefit and automatically increases velocity and this achieves greater sensitivity another way which is by increasing the amplitude of the detected signal.

Coriolis acceleration is proportional to the product of the angular velocity being measured and the velocity of the first direction modulation vibrator and is in the second direction. By vibrating the first direction modulation vibrator at a high velocity and a high frequency, this acceleration is increased so as to be easier to measure. The signal from the second direction accelerator, surprisingly, appears as an amplitude modulated signal with the amplitude or envelope being proportional to the angular velocity being measured and the carrier or modulating frequency being closely related to the frequency of vibration of the first direction modulation vibrator.

With a high frequency of vibration, the signal representing angular velocity is easily detected using conventional equipment including efficient high resonant-frequency accelerometers used at an efficient frequency for the accelerometer. With the product of the frequency and the displacement of the first direction vibrator high, the velocity of the accelerometer is high and since this is the velocity by which the angular velocity is multiplied in determining Coriolis acceleration, the resulting signal is large and may be more easily sensed. Moreover, the signal is a sine wave with an amplitude proportional to the angular velocity being measured, thus permitting easy processing.

Because Coriolis acceleration is a product of two velocities, the velocimeter 12A can measure velocity of rotation with no acceleration about the X-axis. If there is an acceleration together with the velocity, it also energizes the accelerometer which measures in the direction of that acceleration to provide an added signal which can be detected. The measurement is further enhanced because accelerometer measure more accurately at high frequencies and accelerations than low frequencies and accelerations and the modulated output signal is well adapted to make measurements above the noise threshold of existing accelerometers with accuracy.

Figure 2:
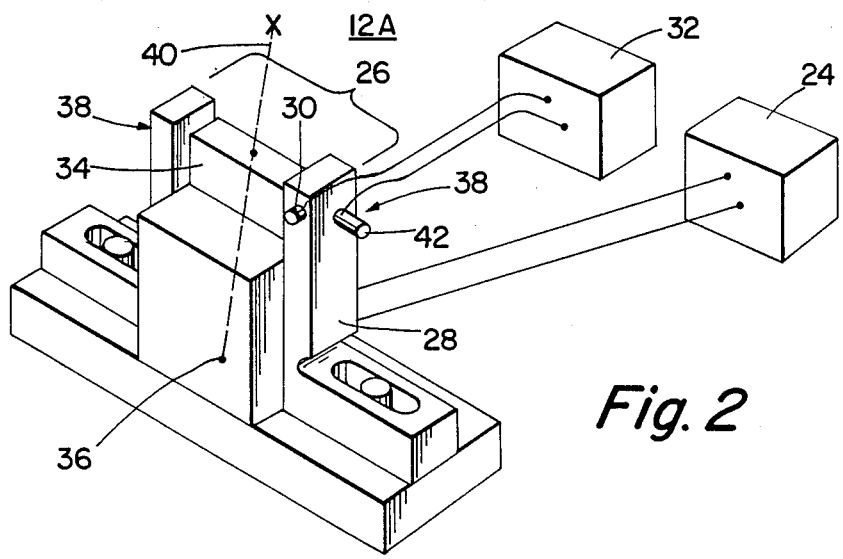
FIG. 2 is a perspective view of an embodiment of the invention.

In FIG. 2, there is shown a simplified perspective view of a velocimeter 12A mounted for rotation about an X-axis shown at 40 and having the modulating signal source 24, the first direction modulation vibrator 26, the second direction restraint 28, the second direction accelerometer 30 and the demodulator 32.

The first direction modulation vibrator 26 includes an electromagnet 34, a mounting member 36 for the electromagnet 34 and two vibrating beams 38. The vibrating beams are each mounted at one end to a base and are composed of ferromagnetic material so that they are drawn to the electromagnet 34 which is positioned between them. A predetermined spacing is permitted between the vibrating beams 38 and the ends of the electromagnet 34 so that when the electromagnet 34 is energized, the vibrating beams are pulled toward it through a fixed displacement and then pushed away from it on the alternating opposite half cycle. Consequently, the vibrating beams 38 are caused to vibrate in a fixed direction under the control of the electromagnet 34.

The vibrating beams 38 are elongated ferromagnetic beams having a narrow edge and a wide edge. The wide edge serves as the second direction restraint 28 inasmuch as it prevents the beam from moving in an angle transverse to the angle in which it is pulled by the electromagnet 34. The second direction accelerometer 30 is mounted to the vibrating beams 38 at a location where it moves and arranged to sense acceleration only in a direction perpendicular to its direction of vibratory movement, perpendicular to the direction of the X-axis 40 and tangential to the orbit of the accelerometer 30 about the X-axis. With this arrangement, the velocimeter 12A measures angular motion about the X-axis 40 or other axes parallel to it when certain translational corrections are mathematically made.

While vibrating beams 38 are shown as the first direction modulation vibrator 26 with the second direction restraint 28 being the stiffness caused by the width of the beams, any other device which provides a known motion in an angle transverse to the X-axis may be used.

While a restraint is used to keep the second direction accelerometer 30 which is carried by the vibrating beam from moving in directions that might be caused by the reaction forces to acceleration, it need not be absolutely prevented from moving in other directions provided the forces or accelerations in the other directions are known so the signal may be corrected for them.

It is important that there be no substantial movement of the second direction accelerometer 30 caused by reaction forces from Coriolis acceleration or other acceleration which is angular about the X-axis on the vibrating beams 38 for which a correction is not provided. In the preferred embodiment, the vibrating beams 38 is not permitted to deflect substantially and carry the second direction accelerometer 30 with them due to the acceleration which is being measured.

The modulating signal source 24 provides signals at a frequency at least ten times the frequency of the angular vibrations about X which are expected to be measured. The sensitivity of the velocimeter 12A is increased in proportion to the velocity of the first direction modulation vibrator 26 in the first direction because the resulting signal representing the angular acceleration about the X-axis is the product of the velocity of the second direction accelerometer 30 in the direction radial to the X-axis 40 and the acceleration of the platform about the X-axis 40.

The demodulator 32 receives the signal from the second direction accelerometer 30 and may receive the signal from the modulating signal source 24 to provide convenient demodulation. It may also receive a signal from a transverse accelerometer 42 although this accelerometer may provide signals which are duplicative of the modulating signal from 24 where the displacement of the second direction accelerometer 30 in each direction as carried by the first direction modulation vibrator 26 is known.

The type of signal which controls the periodic motion is significant only insofar as it imparts adequate velocity to the first direction modulation vibrator 26 and is convenient for demodulation. For that purpose, a sine wave is used in the preferred embodiment but, of course, other signals could be used. Moreover, other signals would be appropriate in the event of different types of devices for moving the accelerometer 30 and thus other forms of demodulation would be used.

In general, three conditions are necessary for the operation of the invention in accordance with the embodiment of FIG. 2. One of those conditions is that the accelerometer 30 must be mounted for motion at a relatively high velocity in a direction perpendicular to the direction of the velocity or acceleration to be measured. A second condition is that it must be at a velocity high with respect to that motion which is to be measured. A third condition is that it must be restrained from moving or being moved by the forces of reaction due to Coriolis acceleration or other accelerations in a direction perpendicular to the axis about which the measured motion occurs and the direction of vibration of the accelerometer 30 by the first direction modulation vibrator 26.

It can be shown that, when the first direction modulation vibrator 26 provides a sinusoidal movement to the second direction accelerometer 30, the minimum angular rate which can be measured with a signal-to-noise ratio of 20 decibels is ten times the noise threshold of the second direction accelerometer 30 multiplied by 386.5 divided by 2, further divided by the amplitude of the vibration and further divided by the frequency of the vibration. Consequently, it can be understood that the design parameters may be easily chosen for the minimum angular velocity that can be measured.

For sinusoidal motion or for any other type of motion, the principal concern with velocity when there is no angular acceleration is the Coriolis acceleration which is the product of the velocity of movement in the first direction multiplied by the angular velocity about the X-axis which is to be measured. Consequently, simplicity may be achieved by a constant vibratory motion to the extent possible with existing demodulation techniques and as high a velocity and frequency as possible. The frequency of oscillation should be approximately one million cycles per second to obtain the response from DC to ten kHz in vibration.

The effect of frequency and velocity of vibration on the accelerometer 30 may be understood by considering the acceleration seen by the second direction accelerometer 30. The acceleration on the second direction accelerometer 30 is the vector sum of: (1) the acceleration of the rotation to be measured around the X-axis; (2) the acceleration of the second direction accelerometer 30 caused by the first direction modulation vibrator 26; and (3) the Coriolis acceleration which is twice the angular velocity of rotation about the X-axis for the velocimeter multiplied by the velocity of the second direction accelerometer 30 with respect to the velocimeter platform caused by the first direction modulation vibrator 26.

The Coriolis acceleration is measured directly by the second direction accelerometer 30 since it is always in a direction transverse to the direction of motion of the accelerometer 30 caused by the first direction modulation vibrator 26. The tangential acceleration or acceleration of the velocimeter 30 about the X-axis includes a component equal to the rotational acceleration around the X-axis multiplied by the distance from this axis to the accelerometer 30 vectorially added to the distance from the X-axis to the accelerometer multiplied by the square of the angular velocity about the X-axis of the velocimeter.

Of these two terms, the first one is added in a direction normal to the direction of rotation about the X-axis and the other is in a radial direction between the second direction accelerometer 30 and the X-axis.

The effect of this acceleration upon the second direction accelerometer 30 depends on the angle of the second direction restraint 38. If it is as in the preferred embodiment restricted to motion in the direction of the X-axis, then the second component equal to the distance between the X-axis and the second direction accelerometer 30 multiplied by the square of the angular velocity is not measured but the entire effect of the angular acceleration about the X-axis of the velocimeter times the distance between the X-axis and the accelerometer 30 is measured.

The effect of this term as compared to the Coriolis acceleration depends on the velocity imparted to the accelerometer 30 by the first direction modulation vibrator 26 in proportion to the distance between the X-axis and the accelerometer 30. It is desirable for the velocity imparted by the first direction modulation vibrator 26 to be large enough to render all other effects negligible.

The acceleration of the second direction accelerometer 30 caused by the first direction modulation vibrator 26 includes two terms, the first of which is the rate of change of the second direction accelerometer 30 with respect to the velocimeter and the second is the product of this velocity times increase in angular velocity of the second direction accelerometer 30 caused by the vibration, which angular velocity is about the X-axis.

The first of these terms is tangential to the motion and would not be measured in the preferred embodiment in which the velocity is always directed radially toward the X-axis. The component of the second term which is the increase in angular velocity of the second direction accelerometer 30 about the X-axis is also zero in this embodiment. If the amplitude of vibration is small and the frequency of vibration large, this second term is negligible even if it is in a different direction.

The component which is caused by motion of the second direction accelerometer 30 by the first direction modulation vibrator 26 has two components, the first of which is the instantaneous acceleration of the second direction accelerometer 30. In the preferred embodiment in which that acceleration is in a direction radial with respect to the X-axis, it is not sensed by the second direction accelerometer 30. Indeed, in any embodiment where the accelerometer is mounted perpendicular to the direction of motion, it does not sense this acceleration. The second term is the product of the instantaneous velocity multiplied by the angular velocity caused by the first direction modulation vibrator 26. In the preferred embodiment in which radial motion is not measured, this component is zero. Assuming that this radial motion is maintained low or at an angle transverse to the second direction accelerometer 30, it is not measured by the second direction accelerometer 30.

In use, the exact construction of the velocimeter depends on the particular use to which it is being put. For example, if it is mounted within an aircraft to control a stable platform with a camera or the like, there is one construction and a different construction if it is only to measure signals about unknown X-, Y- and Z-axes in the aircraft and a still different construction for a vibrating table or the like where it is only necessary to measure the velocity about one known axis. The construction will, however, normally include a member which is mounted to and moves in a known course at known velocities and accelerations with respect to the member, the angular velocity of which is to be measured. The construction should be such as to maximize the reading of Coriolis acceleration and to minimize any type of motion of the vibrating accelerometer which detracts from the clarity of that measurement.

Generally, it will be desirable when the axis of rotation is known to move the accelerometer directly toward and away from that axis using a motion which can be easily detected. The accelerometer is always mounted perpendicular to the motion to and from the axis and its acceleration is the sum of the acceleration of the accelerometer with respect to the body it is measuring added as a vector to the acceleration of the body itself vectorially added to Coriolis acceleration.

With the accelerometer mounted perpendicular to the motion of the accelerometer with respect to the body, it directly measures Coriolis acceleration. If the motion is to and from the axis, there is no measured acceleration of the accelerometer with respect to the body since there will be no tangential acceleration and it is mounted so as to not measure radial acceleration with respect to the body.

The acceleration about the X-axis of the body itself will be measured but, if the velocity of motion with respect to the body is large enough, this signal can be separated and removed. If it is low, it can be discarded. Otherwise, it can be subtracted from the total measurement if separable by its modulation frequency.

If the motion of the accelerometer with respect to the body the angular velocity of which is to be measured is sinusoidal at a known frequency, the modulating signal may be obtained and subtracted from the entire measured acceleration resulting in a separate measurement of: (1) the angular acceleration of the body itself about the X-axis: and (2) the Coriolis acceleration. Coriolis acceleration may be found by dividing the velocity of the accelerometer with respect to the body into Coriolis acceleration since Coriolis acceleration is proportional to the angular velocity of the body multiplied by the velocity of the object moving with respect to the body.

Figure 3:
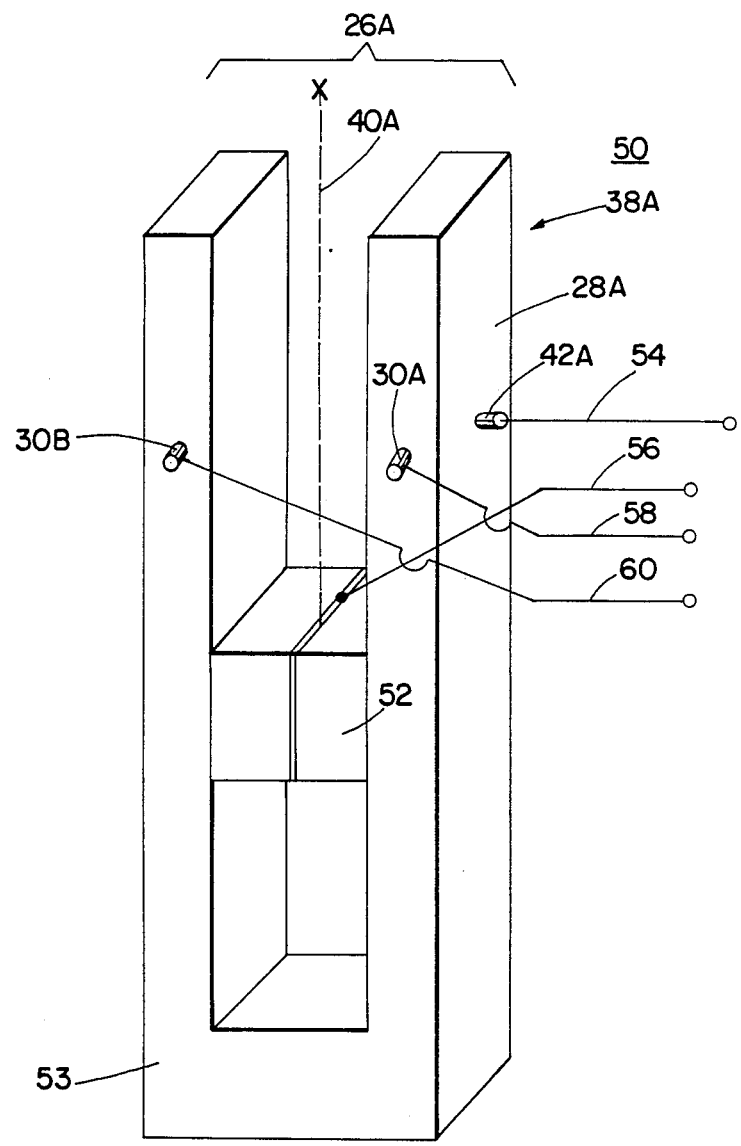
FIG. 3 is a perspective view of the mechanical portion of an embodiment of the invention which is an alternative to the embodiment of FIG. 2.

In FIG. 3 there is shown a perspective view of a tuning fork vibrator and restraint 50 including a driver 52 and a tuning fork 53 integrally mounted together to perform the function of the magnetic vibrator shown in the embodiment of FIG. 2. The principle of operation of the tuning fork vibrator and restrain 50 is substantially the same as the magnetic vibrator of FIG. 2 but better adapted for small size precise measurements.

The tuning fork vibrator and restraint 50 includes a first direction modulation vibrator 26A, a second direction restraint 28A, two second direction accelerometers 30A and 30B, and a first direction accelerometer 42A, with the accelerometer 42A being electrically connected to a conductor 54 and the accelerometers 30A and 30B being electrically connected to conductors 58 and 60 respectively. The driver 52 is a piezoelectric crystal mounted to the tines of the fork 53 and electrically connected to a conductor 56 to receive signals driving it.

The driver 52 is mounted between the tines at a location where its mechanical output impedance matches as closely as possible the mechanical input impedance of the tuning fork 53 at the system's resonant frequency. The mechanical output impedance of commercial piezoelectric crystals is given by the manufacturer as stiffness and the mechanical input impedance of tuning forks can be calculated using standard equations. Stiffness and mechanical impedance are described and methods for calculating them are provided in "Fundamentals of Accoustics" by Lawrence E. Kinsler and Austin R. Frey, published by John Wiley and Sons, Inc., N.Y., second edition, the disclosure of which is incorporated herein. However, the location for impedance matching at the driver frequency can be found empirically and results in maximum defection of the accelerometers at the system resonant frequency and thus resulting in maximum velocity of the accelerometers. With this arrangement, maximum energy is transmitted to the tines of the tuning fork by the driver 52.

The driver 52 is energized by conductor 56 at the frequency of modulation in the same manner as the electromechanical modulation of FIG. 2 and this value is the natural resonant frequency of the tuning fork system. The accelerometers 30A, 30B and 42A are mounted at a location which will vibrate at the modulating voltage, thus providing a greater deflection amplitude than provided by the driver 52. The accelerometers 30A and 30B are mounted to sense Coriolis acceleration in the same manner as the accelerometer 30 (FIG. 2) and may be the same type of piezoelectric accelerometer mounted to measure acceleration only in a direction perpendicular to the vibration of the tuning fork. The accelerometer 42A, on the other hand, directly measures the acceleration of the tines and applies a signal through conductor 54 containing this modulation signal.

While the accelerometers in the embodiment of FIG. 3 are mounted to the tines of a tuning fork to measure displacement, it is possible to mount them directly to the piezoelectric crystal 52 but the velocity of movement in the vibrating direction will be lower and thus the signal may be lower. The tines of the tuning fork are to increase the deflection and thus the velocity while retaining the frequency the same to provide a larger amplitude of Coriolis-acceleration signal to the conductors. Moreover, it is obvious that other vibrating members may be used in accordance with the explanation of the embodiment of FIG. 2.

Figure 4:
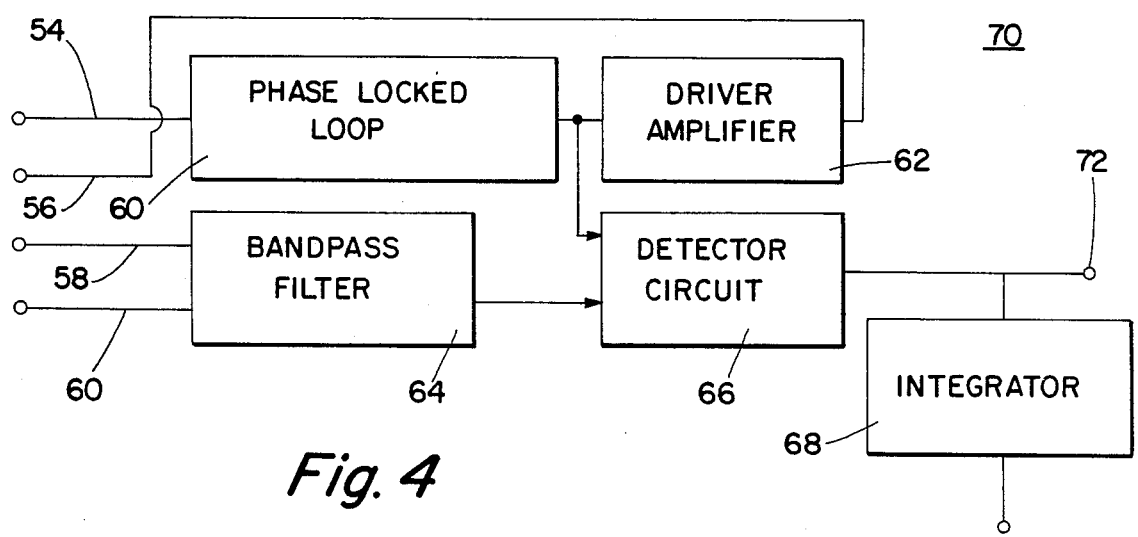
FIG. 4 is a block diagram of the electrical portion of the embodiment of FIG. 3.

In FIG. 4, there is shown a block diagram of the driver-detection circuit 70 having a phase locked loop 60, a driver amplifier 62, a band pass filter 64, a detector circuit 66 and an integrator 68. The phase locked loop 60 and driver amplifier 62 maintain the frequency of vibration at the preset rate, being connected in a feedback loop with the driver 52 (FIG. 3) and the accelerometer 42A (FIG. 3), whereas the band pass filter 64 and detector 66 generate a demodulated signal representing the angular rotation, for application to the integrator 68 or to an output terminal 72.

Two accelerometers 30A and 30B are used to reduce noise and reduce signals that may be generated by translational acceleration of the tuning fork in the direction of the accelerometers. The signals are subtracted from each other which adds the signals related to Coriolis acceleration but cancels the signals relating to translation.

Because accelerometers may generate signals at right angles to their axis, the selection of accelerometers 30A and 30B is made partly based on cross axis sensitivity. Manufacturers provide this value to indicate the ratio of signal from acceleration in the direction perpendicular to the axis to the signal for acceleration parallel to the axis. This cross axis signal should be as low as possible. It must be sufficiently low so that the signal to be measured is within the dynamic range of the electrical system without the cross axis signal saturating the electrical system.

The cross axis sensitivity with one accelerometer as in the embodiment of FIG. 2 or twice the cross axis sensitivity with two accelerometers mounted as 30A and 30B in FIG. 3 must be less than the product of the dynamic range of the circuit and the minimum angular velocity being measured, which product is divided by the product of 100 and the resonant frequency of the vibrating system.

In selecting the accelerometers, the resonant frequency of the system is compared to the resonant frequency of the accelerometers. The resonant frequency of the accelerometers should be sufficiently high so that the generated signals are in a linear portion of the output. This means the frequency of the measured acceleration should be lower than the accelerometers resonant frequency and generally the resonant frequency of the accelerometer should be more than ten percent higher than the vibrating system resonant frequency. The combined mass of the accelerometers should be less than twenty percent of the mass of the vibrating system.

The phase locked loop 60 and the driver amplifier 62 may be conventional units such as are sold commercially on the market. The phase locked loop 60 receives a signal on conductor 54 from the accelerometer 42A and applies it through the driver amplifier 62 back to the driver 52 through conductor 56, thus maintaining the frequency of the driver 52 locked to that of the accelerometer 42A. The driver should be as stiff as possible to increase the frequency of the system and may be connected to the tines.

The bandpass filter 64 receives signals from the first and second, second-direction accelerometers 30A and 30B FIG. 3) on conductors 58 and 60 respectively. The bandpass filter 64 is electrically connected to have a center frequency which is the modulating frequency and a pass band having a bandwidth which is 0.2 times the center frequency to pass the modulated frequency only and eliminate noise. The detector circuit 66 is a conventional detector circuit of the type used to demodulate the carrier frequency in radio circuits to provide an output signal which is demodulated to conductor 72 and to the integrator 68. The integrator 68 integrates the signal and provides another signal which is the integral of the angular velocity.

In the preferred embodiment, a sinusoidal modulation is utilized and the signal is demodulated to obtain a measurement of velocity. That measurement may be used to control the stable platform on an aircraft so as to provide stability to a camera.

As can be understood from the above description, the velocimeter of this invention has several advantages, such as: (1) it is simple and economical; (2) it is much more sensitive than prior art economical velocimeters; and (3) it is relatively inexpensive to derive a measurement of velocity from the electrical signal provided by the velocimeter.

Although a specific embodiment of the invention has been described with great particularity, it is to be understood that many variations in the preferred embodiment may be made without deviating from the invention. Therefore, it is to be understood that, within the scope of the appended claims, the invention may be practiced other than as specifically described.

What is claimed is:

1. A method of obtaining a signal representing motion of an object in a curved path about an axis comprising the steps of:

periodically moving a point on a sensing means mounted to the object for movement therewith along a predetermined path different from said curved path for a number of cycles of periodic motion, wherein at lest a portion of the predetermined path is in a first direction at an angle to said curved path, whereby forces of reaction to Coriolis acceleration are exerted on said sensing means;

sensing the forces created by Coriolis acceleration of a point on said sensing means that moves along the predetermined path and converting the sensed forces of reaction to an electrical signal; wherein:

(a) said sensing of the forces created by Coriolis acceleration is in a second direction at an angle to said first direction and to the curved path; and (b) said sensing and converting to an electrical signal occurs while said sensing means is prevented from being moved with respect to said object by forces by Coriolis acceleration and of angular acceleration at an angle to said predetermined path by a distance that is more than two percent of the length of the movement of the sensing means along the predetermined path during one cycle of the movement of the sensing means along the predetermined path and the forces of reaction of said Coriolis and angular acceleration are passed to said object from said sensing means; and using said electrical signal as a measure of the angular velocity of said object about said axis.

2. A method according to claim 1 in which the step of periodically moving a sensing means along a predetermined path with respect to said object includes the step of periodically moving said sensing means with linear motion with respect to said object.

3. A method according to claim 2 in which the step of periodically moving a sensing means along a predetermined path with respect to said object includes the step of periodically moving said sensing means along a predetermined path with respect to said object with a velocity that is sinusoidal.

4. Apparatus for obtaining a signal representing motion of an object in a curved path about an axis comprising:

accelerometer means for generating an electrical signal related only to a motion of a point on the accelerometer means in a single direction relative to the object;

said accelerometer means being mounted to said object at a location offset from said axis to measure acceleration only in a first direction substantially perpendicular to said axis;

means for moving said accelerometer means along a predetermined path at least a portion of which is in a second direction at an angle to said first direction with respect to said object while said accelerometer means continues to measure acceleration in said first direction;

said accelerometer means being mounted for movement along said predetermined path; and means for preventing substantial motion of the point on the accelerometer means relative to said object in said first direction of said accelerometer means in response to the forces of reaction to Coriolis acceleration caused by motion in said second direction perpendicular to said first direction and rotation of said object, whereby the signal generated by said accelerometer means is proportional to the cross product of the velocity of angular rotation of said object about said axis and the velocity of said accelerometer means in said second direction.

5. Apparatus according to claim 4 in which said means for preventing substantial motion of said accelerometer in a first direction includes means for preventing movement of more than two percent with respect to said object in a direction perpendicular to said axis as compared with motion in a direction along said axis in response to the forces of reaction to Coriolis acceleration in a direction perpendicular to said axis.

6. Apparatus according to claim 4 in which said object has a known maximum angular frequency and said means for moving said accelerometer means includes means for moving said accelerometer means with linear motion having a frequency at least ten times the angular frequency of said object about said axis.

7. Apparatus according to claim 6 in which said means for moving said accelerometer includes means for moving said accelerometer with sinusoidal velocity.

8. Apparatus according to claim 6 further including a second accelerometer mounted along said axis with said first accelerometer and said means for moving includes means for moving said two accelerometers toward and away from each other in synchronism.

9. A method according to claim 1 in which the motion of the object in a curved path has a known maximum expected frequency of angular motion in the curved path and said step of periodically moving along a predetermined path with respect to said object includes the step of moving said sensing means along said predetermined path with respect to said object at a frequency which is at least ten times the expected maximum frequency of angular motion of the object.

10. A method according to claim 1 in which the step of periodically moving a sensing means along a predetermined path different from said curved path includes the step of vibrating said sensing means with a vibrating transducer.

11. A method according to claim 10 in which the step of vibrating includes the step of vibrating said sensing means with a piezoelectric element.

12. A method according to claim 11 in which the step of vibrating said sensing means includes the substep of vibrating a member at a frequency at least ten times the maximum frequency expected for the motion in the curved path about an axis which frequency is lower than the resonant frequency of the sensing means.

13. A method according to claim 12 in which said transducer is a piezoelectric crystal energized at said frequency by an electrical signal and mounted at a location with respect to the said flexible member where its output mechanical impedance matches the input impedance of the flexible member, whereby efficient energy transfer between the piezoelectric crystal and the flexible member is provided.

14. Apparatus according to claim 4 in which said means for moving said accelerometer means includes:
an elongated member having a predetermined resonant frequency;
transducer means for vibrating said elongated member at a frequency at least ten times the maximum frequency expected for said motion of an object in a curved path;
said transducer means having a mechanical output impedance substantially equal to the mechanical input impedance of said elongated means at the mechanical resonant frequency of said means for moving said accelerometer; and
said accelerometer means being mounted at a location on said elongated member where it is vibrated at said predetermined frequency.

15. Apparatus according to claim 4 in which:
the motion of the object in a curved path has a known maximum expected frequency of angular motion in the curved path; and
said means for moving said accelerometer means along a predetermined path includes means for moving said accelerometer means along said predetermined path with respect to said object at a frequency which is at least ten times the expected maximum frequency of angular motion of the object.

16. Apparatus according to claim 13 in which the means for moving said accelerometer means along a predetermined path different from said curved path includes a vibrating transducer means.

* * * * *